United States Patent
Roberge

(10) Patent No.: US 10,212,873 B2
(45) Date of Patent: Feb. 26, 2019

(54) HYBRID TILLAGE IMPLEMENT FOR VERTICAL TILLAGE AND AERATION OF SOIL WITH DEPOSIT OF SOIL ADDITIVE

(71) Applicant: CNH Industrial Canada, Ltd., Saskatoon (CA)

(72) Inventor: Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/407,708

(22) Filed: Jan. 17, 2017

(65) Prior Publication Data

US 2018/0199500 A1 Jul. 19, 2018

(51) Int. Cl.
*A01B 21/08* (2006.01)
*A01B 25/00* (2006.01)
*A01B 45/02* (2006.01)
*A01B 49/06* (2006.01)
*A01C 23/00* (2006.01)
*A01C 23/02* (2006.01)

(52) U.S. Cl.
CPC .............. *A01B 49/06* (2013.01); *A01B 21/08* (2013.01); *A01B 25/00* (2013.01); *A01B 45/023* (2013.01); *A01C 23/008* (2013.01); *A01C 23/021* (2013.01); *A01C 23/023* (2013.01)

(58) Field of Classification Search
CPC ......... A01B 21/08; A01B 21/00; A01B 25/00; A01B 45/023; A01B 45/02; A01B 45/00; A01B 49/06; A01B 49/04; A01B 49/00; A01C 23/008; A01C 23/00; A01C 23/021; A01C 23/02; A01C 23/023
See application file for complete search history.

(56) References Cited

U.S. PATENT DOCUMENTS

| | | | |
|---|---|---|---|
| 1,739,765 A | 12/1929 | McEwen | |
| 2,439,743 A | 4/1948 | McEwen | |
| 4,258,635 A * | 3/1981 | Lutz | A01B 33/021 111/135 |

(Continued)

FOREIGN PATENT DOCUMENTS

| | | |
|---|---|---|
| CA | 2 016 414 A1 | 11/1991 |
| CN | 105103685 A | 12/2015 |

OTHER PUBLICATIONS

"MT Combo Plane 783HD Aerator/Ripper, s/n 233", Proxibid, May 2014 (3 pages).

(Continued)

*Primary Examiner* — Christopher J. Novosad
(74) *Attorney, Agent, or Firm* — Rebecca L. Henkel; Rickard K. DeMille

(57) ABSTRACT

An agricultural tillage implement has a vertical tillage section and an aerating section behind the vertical tillage section, each extending substantially perpendicular to the pull direction of the implement. Individual vertical tillage elements, such as disc blades, can be indexed with individual rotary tine assemblies of the aerator section so that discrete holes formed by the aerator section are positioned between substantially continuous slits formed by the vertical tillage section. A ground deposit system deposits a component on the ground and may be configured for conducting and depositing a granular component, such as seeds, fertilizers, minerals or the like, or liquid components, such as liquid manure.

13 Claims, 7 Drawing Sheets

(56) References Cited

U.S. PATENT DOCUMENTS

| | | | |
|---|---|---|---|
| 4,699,220 A | 10/1987 | Strohm | |
| 4,895,211 A | 1/1990 | Harris | |
| 8,047,299 B2 | 11/2011 | Hurtis et al. | |
| 8,176,993 B2 | 5/2012 | McNabb | |
| 8,944,176 B2 | 2/2015 | Kiser et al. | |
| 9,241,438 B2 | 1/2016 | Bassett | |
| 2007/0289511 A1* | 12/2007 | Chen | A01B 33/16 111/92 |
| 2014/0166320 A1 | 6/2014 | Olsen | |

OTHER PUBLICATIONS

"Aerate and prepare your soil up to 300m", Aerator Ripper, Equalizer, 2016 (3 pages).
"Ripper/Aerator", Lydon Engineering & Harrows, 2016 (3 pages).

\* cited by examiner

HYBRID TILLAGE IMPLEMENT FOR VERTICAL TILLAGE AND AERATION OF SOIL WITH DEPOSIT OF SOIL ADDITIVE

BACKGROUND OF THE INVENTION

1. Field of the Invention

The present invention relates to agricultural implements, and, more particularly, to agricultural field tillage seeding and fertilizing implements. Still more particularly the invention pertains to tillage implements that combine multiple tilling operations in a single unit, including vertical tillage and aerating with a fertilizing or seeding.

2. Description of the Related Art

Farmers utilize a wide variety of tillage implements to prepare soil for planting. Common tilling operations include plowing, harrowing and sub-soiling, which are performed by pulling a tillage implement behind a motorized tractor. A farmer may need to perform several tilling operations at different times over a crop cycle to properly cultivate the ground to suit the crop choice and soil conditions. Some such implements include two or more sections coupled together to perform multiple functions as the implement is pulled through the field. For example, a cultivator/harrow is capable of simultaneously tilling and leveling the soil in preparation for planting. This implement includes a cultivator that is towed by a tractor and a harrow that is towed by the cultivator.

In one type of tilling operation, vertical tillage, rows or gangs of circular disc blades are pulled through the soil at variable depths to break up clods or lumps of soil, as well as old plant material to provide a more amenable soil structure for planting and to level the soil surface. The gangs of discs are arranged on frames that extend generally laterally with respect to the direction of movement through a field and more particularly are angled with respect to the direction of movement. It is known to angle a first set outward and a following set inwardly so that soil moved outwardly by the first set is returned inwardly by the following set.

While the use in a tilling operation of multiple angled gangs of discs with relatively sharp edges has been effective particularly for cutting plant residue, it is not without problems. An increased gang angle can leave large clods of soil that may require multiple passes to pulverize. The side pressure of the soil against the sides of flat or shallow discs can break the discs. Increasing the concavity of the discs to improve their strength promotes the formation of an undesirable compaction layer. Multiple passes of the tillage implement over the same area of soil may be required to properly cultivate the soil and cut through heavy crop residue. If multiple passes are required, the farmer incurs increased costs associated with the amount of time and fuel required to prepare the seedbed. The discs being angled relative to the travel direction of the implement can establish greater resistance, requiring more power for the tilling operation.

The use of cultivators also can be problematic. Cultivators can compact the soil under the prepared seedbed. A layer of compacted soil inhibits plant germination, root growth, and crop yield. The presence of a compacted layer of soil may require an additional tillage operation such as plowing to break up the compacted earth in order to avoid the problems of poor water absorption and weak anchoring of crops in the ground.

Decompaction and aeration are used sometimes in pasture lands or fields after harvesting forage or cereals to increase the level of oxygen absorbed by the soil to increase crop growth. It is not always necessary to significantly disturb the soil, just open the soil to allow better penetration of air, water and added nutrients. Accordingly, it is sometimes desirable to condition and improve the soil without substantially disturbing the soil.

Thus, there is a need for a tillage implement that is capable of cutting plant residue effectively and tilling the soil in a single pass without excessively disturbing the soil.

It is necessary to till also when performing certain seeding and/or fertilizing operations. For example, it is sometimes necessary to do at least limited soil preparation when over seeding pastureland, or when planting a cover crop to protect the ground over winter or another fallow season, after harvesting, possibly in the fall, and before the next crop planting, such as in the spring. Planting a cover crop protects the ground from erosion and can add vital nutrients to the soil when the cover crop is tilled into the soil before the next planting. It is advantageous to combine soil preparation and seeding to save time, expense and fuel costs.

Many farming operations now include the use of liquid manure handling systems in which animal waste is stored and periodically added to fields for disposal, with the added benefit of fertilization. To prevent undesirable runoff and potential surface water contamination, under some regulations, it is necessary to perform at least a limited tilling operation to open the soil surface and allow more immediate and more rapid absorption of the liquid manure into the field.

Thus, there is a need for tillage implement that provides at least some limited tilling easily and efficiently together with another operation, such as seeding or manure spreading.

SUMMARY OF THE INVENTION

The present invention provides a tillage implement having discs oriented perpendicular to or at a shallow angle to perpendicular followed by rotary aerator tines to break soil and plant material, and improve soil oxygenation with minimal soil disruption. The soil addition is combined with the aeration step by including distribution devices immediately following the rotary aerator tines with a connection to a source of the soil additive In one form, the hybrid tillage implement provides a main frame including a pull hitch extending in a travel direction; a vertical tillage section carried by the frame and extending generally laterally with respect to the travel direction; and an aerating section carried by the frame behind the vertical tillage section, the aerating section extending generally laterally with respect to the travel direction. The aerating section includes individual tines to create discrete holes in ground being tilled. A ground deposit system is connected to the frame and includes a supply for a component to be deposited in the ground, a distribution network connected to the supply for distributing the component and outlets from the distribution network for expelling the component to the ground.

In another form, the hybrid tillage implement is provided with a main frame including a pull hitch extending in a travel direction; a row of disc blades carried by the frame and extending generally laterally to the travel direction, and a row of rotary tine assemblies carried by the frame behind the row of disc blades and extending generally laterally to the travel direction. The row of rotary tine assemblies includes individual tines to create discrete holes in the ground being tilled. A ground deposit system is connected to the frame and includes a supply for a component to be deposited in the ground, a distribution network connected to the supply for distributing the component within the tillage implement, and outlets from the distribution network for expelling the component to the ground behind the row of rotary tine assemblies.

In still another form, the hybrid tillage implement is provided with a main frame including a pull hitch extending in a travel direction; a row of disc blades carried by the main frame in a disc blade left row and a disc blade right row extending generally laterally to the travel direction and substantially symmetric about a centerline of the implement; and a row of rotary tine assemblies carried by the main frame in a tine assembly left row behind the disc blade left row and a tine assembly right row behind the disc blade right row. The tine assembly left row and the tine assembly right row extend generally laterally to the travel direction and substantially symmetric about the centerline of the implement. A ground deposit system connected to the frame includes a supply for a component to be deposited on the ground, a distribution network connected to the supply for distributing the component within the tillage implement, and outlets from the distribution network for expelling the component to the ground behind the rotary tine assemblies.

An advantage of the hybrid tillage implement disclosed herein is that the soil can be conditioned without being substantially disturbed, including the injection of liquid manure or the deposit of granular components, such as seeds, granular fertilizers, other soil amendments and the like.

Another advantage of one form of the hybrid tillage implement is that efficient and effective liquid manure injection is provided while limiting surface runoff and promoting absorption.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
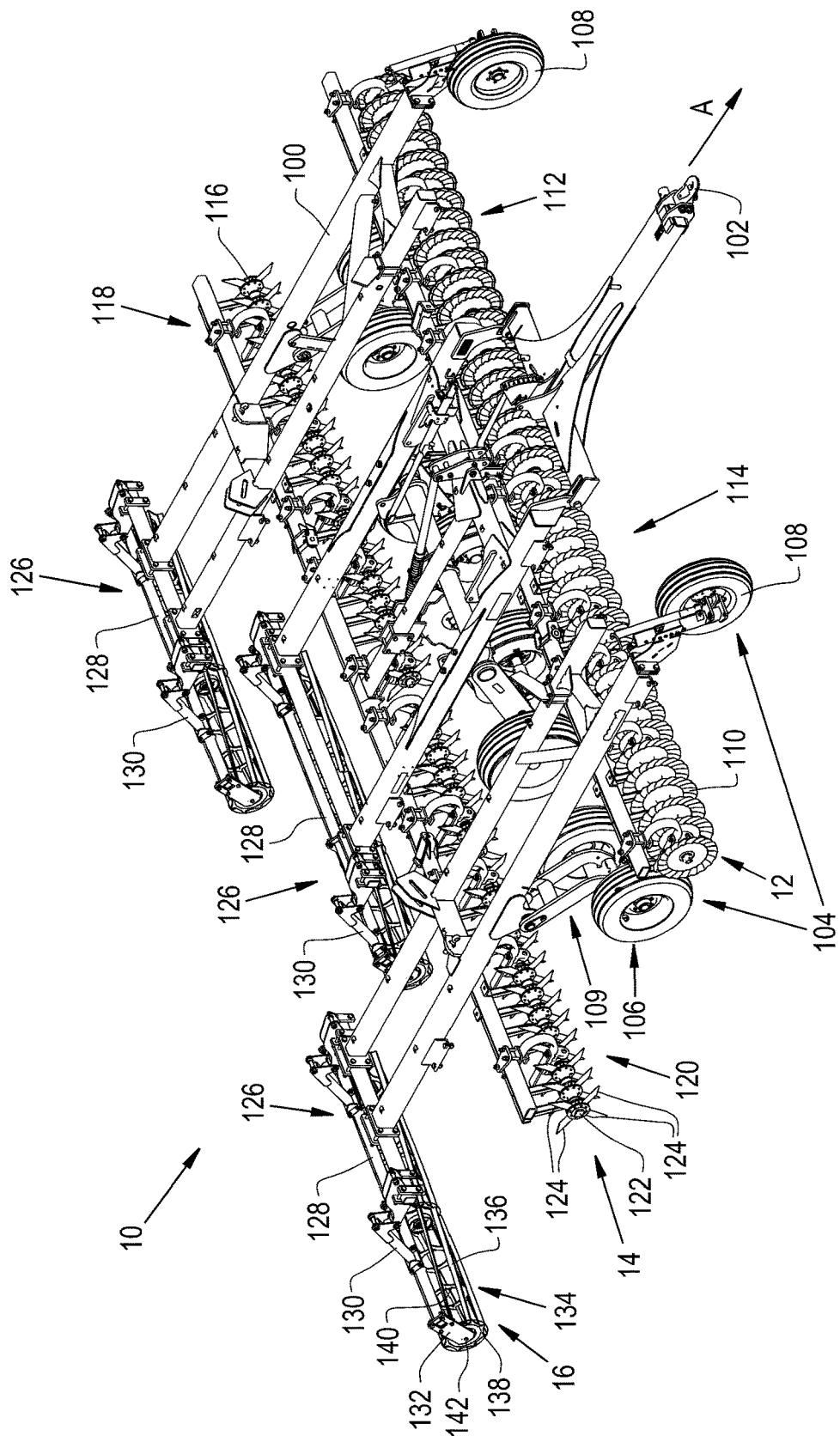
FIG. 1 is a perspective view of a hybrid tillage implement.

Referring to FIG. 1, a tillage implement 10 is shown. An agricultural vehicle (not shown) pulls the tillage implement 10 in a travel direction A. The tillage implement 10 of the exemplary embodiment shown includes a vertical tillage section 12 at the front thereof, an aerating section 14 following behind vertical tillage section 12 and a soil conditioning section 16 behind aerating section 14. Vertical tillage section 12, aerating section 14 and soil conditioning section 16 are generally symmetrically arranged about a centerline 18 of implement 10. Vertical tillage section 12 is provided for generally breaking large clumps or clods of dirt and plant material, cutting or breaking plant residue such as stalks, stems or large leaves and cutting generally continuous slits in the soil surface. Aerating section 14 is provided for creating discrete spaced openings in the soil between the slits created by the vertical tillage section. Soil conditioning section 16 smoothens and evens the soil surface while providing additional crumbling or breaking of clumps or conglomerated soil or plant matter. In some applications and uses, implement 10 may include only vertical tillage section 12, with one or two gangs of discs, and aerating section 14.

Figure 2:
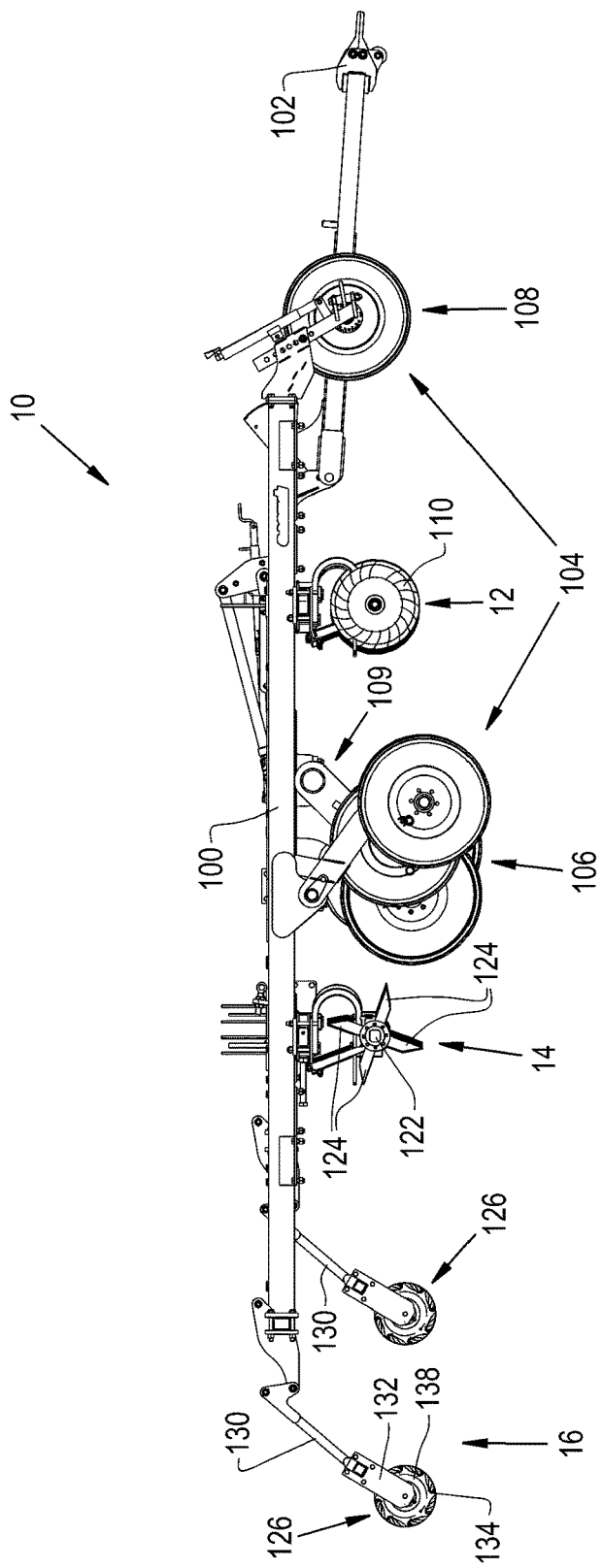
FIG. 2 is a side elevational view of the hybrid tillage implement shown in FIG. 1.
Figure 3:
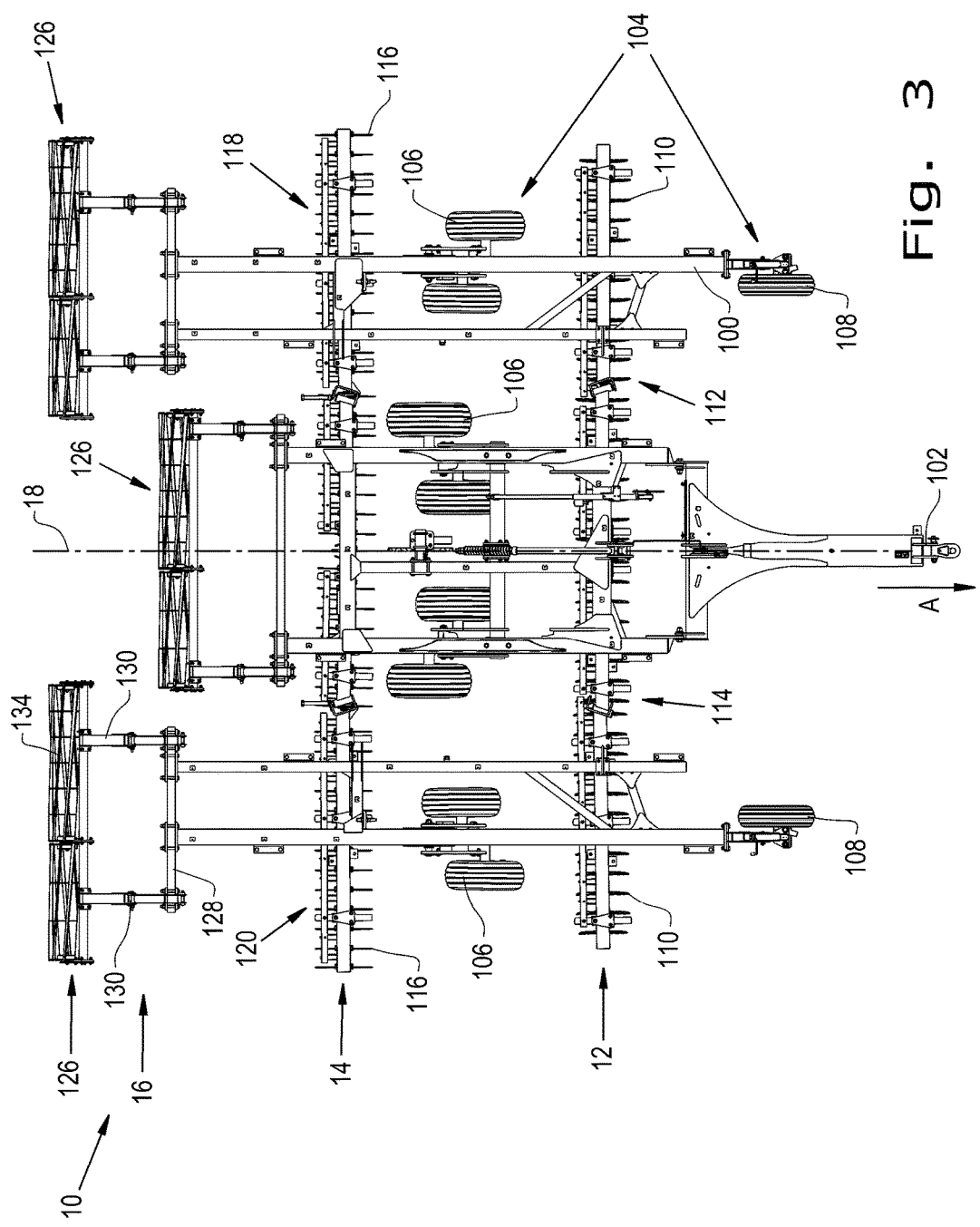
FIG. 3 is a top view of the hybrid tillage implement.

Referring now additionally to FIGS. 2 and 3, implement 10 includes a main frame 100 having a hitch 102 on the front end that may be used to connect the tillage implement 10 to an agricultural vehicle, such as a tractor. Vertical tillage section 12, aerating section 14 and finishing section 16 are connected to and carried by mainframe 100. A set of wheels 104 is connected to main frame 100 and oriented in a direction that is in general alignment with the travel direction A. The set of wheels 104 includes center wheels 106 and pivoting wheels 108. Center wheels 106 are attached across the main frame 100 at positions, for example, roughly midway between the front and rear ends of the main frame 100. The center wheels 106 may include a system 109 for adjusting the distance between the main frame 100 the center wheels 106. The system 109 for adjusting may permit the center wheels 106 to be statically fixed during the movement of the tillage implement 10 or to be dynamically adjustable as the tillage implement 10 travels. The pivoting wheels 108 are connected to the front outer ends of the main frame 100. The pivoting wheels 108 may include at least two pivoting wheels that reduce the amount of lateral movement of tillage implement 10 as it is pulled.

Vertical tillage section 12 includes a row of individual concave, sharpened and grooved disc blades 110 attached to the main frame 100. In accordance with one configuration, the row of concave disc blades 110 includes a disc blade left row 112 and a disc blade right row 114. In the configuration shown in FIG. 1, the disc blade left row 112 is symmetric about a centerline 18 of the tillage implement 10 with the disc blade right row 114. Disc blade left row 112 and disc blade right row 114 are substantially perpendicular to centerline 18, but can be provided also at an angle. Perpendicular orientation to the direction of travel reduces the power requirement for operation; however, in some instances a slight angle of up to about five degrees from perpendicular can be used without substantially increasing the power requirement.

The individual disc blades 110 of disc blade left row 112 and disc blade right row 114 can be of types well known to those skilled in the art, such as fluted blades, serrated blades, smooth blades or the like. In some preferred applications and uses, the individual blades of disc blade left row 112 and disc blade right row 114 have substantially thin or sharpened edges so as to cut through and/or break up crop residue such as stalks, stems and large leaves, as well as clumps or clods of roots and soil. Further, while disc blades 110 are shown for vertical tillage section 12, it should be understood that other types of tillage devices can be used, such as cultivator shoes or the like.

Aerating section 14 includes a row of rotary tine assemblies 116 attached to the mainframe 100. In accordance with one configuration, the row of rotary tine assemblies 116 includes a tine assembly left row 118 and a tine assembly right row 120. In the configuration shown, the tine assembly left row 118 is symmetric about centerline 18 of the tillage implement 10 with the tine assembly right row 120. Tine assembly left row 118 and tine assembly right row 120 are substantially perpendicular to centerline 18. The individual rotary tine assemblies 116 of rotary tine assembly left row 118 and rotary tine assembly right row 120 each include a hub or body 122 and four individual tines 124 radiating therefrom in equally spaced arrangement. The individual tines 124 are configured to pierce the soil to open discrete holes therein, to facilitate penetration of water, nutrients and air.

Vertical tillage section 12 and aerating section 14 can be indexed one with the other such that the individual rotary tine assemblies 116 of tine assembly left row 118 operate in the spaces between adjacent individual disc blades 110 of disc blade left row 112, and the individual rotary tine assemblies 116 of tine assembly right row 120 operate in the spaces between adjacent individual disc blades 110 of disc blade right row 114. Accordingly, elongated slits formed by individual disc blades 110 alternate with rows of discrete holes formed by individual tines 124 in a tilling pass made by implement 10.

Soil conditioning section 16 includes rolling basket assemblies 126 connected to the rear end of the main frame 100, behind aerating section 14. Although three rolling basket assemblies 126 are shown in the exemplary embodiment, two of which are shown having rotational axes collinear with one another but not collinear with the third rolling basket assembly 126, the soil conditioning section 16 may include fewer or more individual rolling basket assemblies 126.

Rolling basket assemblies 126 are connected to the main frame 100 by a system of beams 128 and arms 130 extending rearward from the main frame 100 and downwardly to engage the rolling basket assemblies 126. Each rolling basket assemblies 126 includes a frame 132 connected to arms 130 and to the ends of a rolling basket 134. The rolling basket 134 is formed by a plurality of bars 136, which may be arranged helically, and which extend between end caps 138 and around a set of supporting framework rings 140. The end caps 138 engage a rotational coupling 142 to allow the rolling baskets 134 of rolling basket assemblies 126 to rotate.

Figure 4:
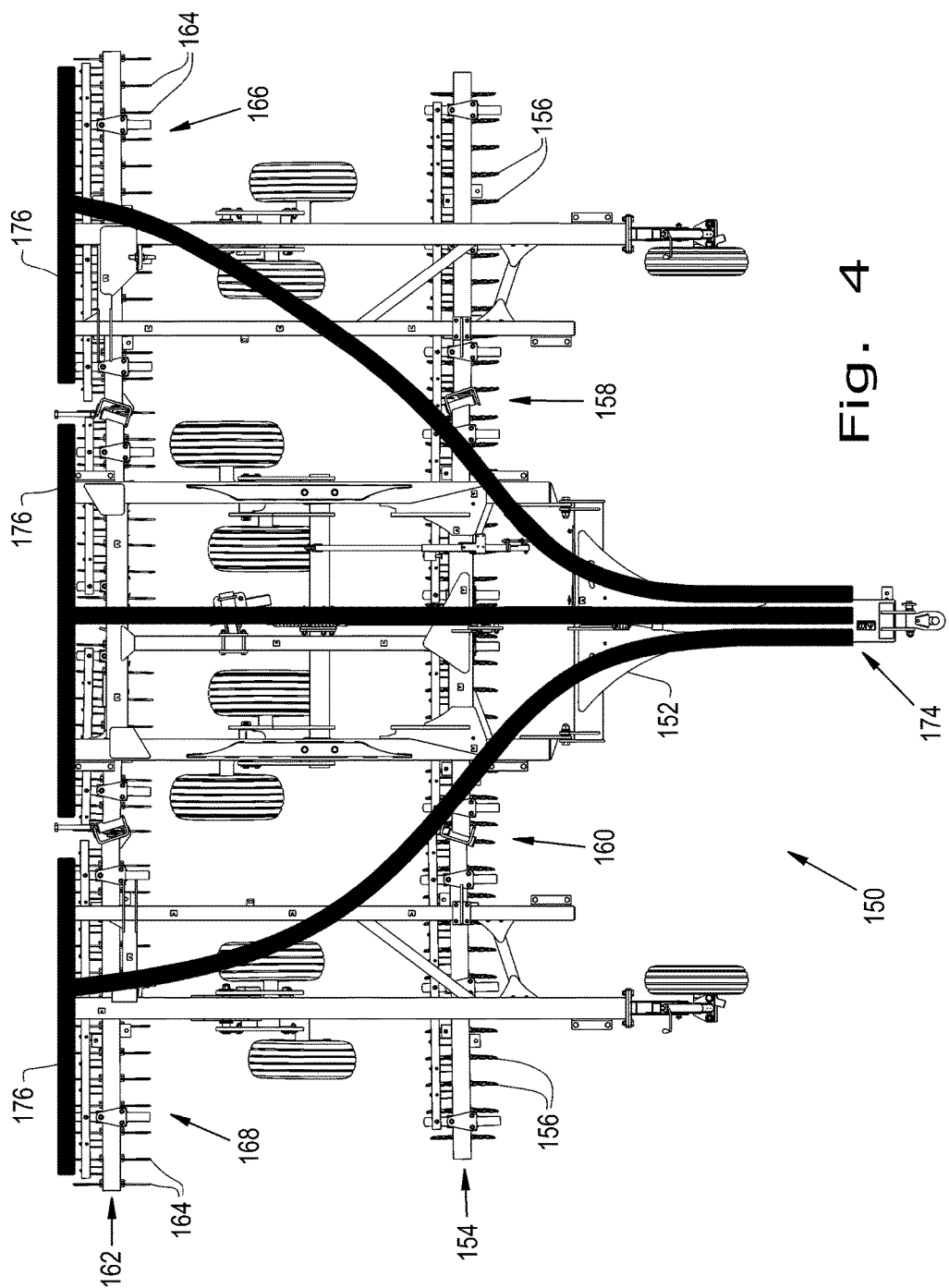
FIG. 4 is a top view of another embodiment for a hybrid tillage implement.
Figure 5:
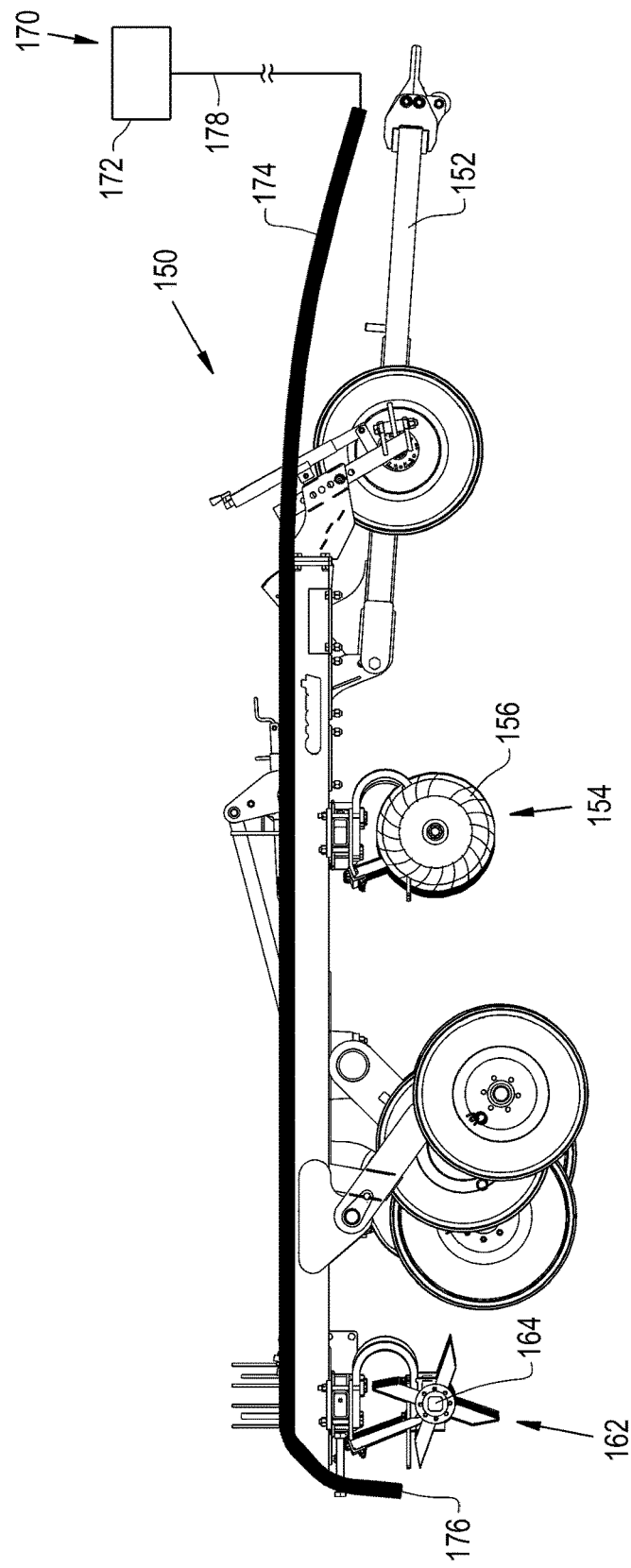
FIG. 5 is a side elevational view of the hybrid tillage implement shown in FIG. 4.

Referring now to FIGS. 4 and 5, a further embodiment is shown for a tillage implement 150 suitable for injecting liquid manure in a field. Tillage implement 150 includes a main frame 152 carrying a vertical tillage section 154 having disc blades 156 carried in a disc blade left row 158 and a disc blade right row 160. Main frame 152 further carries an aerating section 162 including rotary tine assemblies 164 carried in a rotary tine assembly left row 166 and a rotary tine assembly right row 168. Disc blades 156 and rotary tine assemblies 164 are similar to the disc blades 110 and rotary tine assemblies 116 described previously herein. Vertical tillage section 154 and aerating section 162 are arranged similarly to vertical tillage section 12 and aerating section 14 as described previously herein, that is, substantially perpendicular to the centerline of the implement. However, it should be understood that the disc blade rows 158, 160 and tine assembly rows 166, 168 can be arranged at angles of up to about five degrees from perpendicular without substantially increasing the power requirement for operation.

Tillage implement 150 further includes a ground deposit system 170 (FIG. 5) configured for containing, distributing and depositing a component to be added to the soil. In the embodiment shown, ground deposit system 170 is adapted for injecting liquid manure onto the soil. Liquid manure ground deposit system 170 includes a liquid manure supply 172, a liquid manure distribution network 174 and liquid manure outlet 176 from which the liquid manure is broadcast onto the ground behind the rotary tine assemblies 164.

Liquid manure supply 172 can be a tank having a pressurized manure hose 178 suitable for conducting liquid manure to distribution network 174. Liquid manner supply 172 as a tank can be carried on or connected to tillage implement 150 for transporting volumes of liquid manure over a field during a tillage operation. Liquid manure supply 172 can be a wheeled tank, cart or wagon carried in front of or behind implement 150. Alternatively, liquid manure supply 172 can be a liquid manure retention pond, lagoon or stationary holding tank or other holding reservoir from which liquid manure is pumped directly to implement 150 by way of pressurized manure hose 178. While pressurized manure hose 178 is shown connected to liquid manure distribution network 174 at the front of implement 150, it should be understood that the arrangement can be reversed, with pressurized manure hose 178 connected to liquid manure distribution network 174 at or near the rear of implement 150, or at some other position on implement 150.

Tillage implement 150 may further include a soil conditioning section similar to soil conditioning section 16 described previously herein, or some such other suitable leveling or tilling arrangement. Alternatively, tillage implement 150 may be provided without a finishing section.

Liquid manure ground deposit system 170 as described above provides advantageous features for promoting the rapid absorption of liquid manure into the ground. Implement 150 opens both substantially continuous slits formed by disc blades 156 and discrete holes formed by rotary tine assemblies 164. These ground surface openings promote the reception and retention of liquid manure while inhibiting runoff. The slits and holes formed by disc blades 156 and rotary tine assemblies 164 increase the surface area for absorption of liquid manure deposited thereon. By carrying liquid manure outlets 176 immediately behind aerating section 162, the liquid manure is received immediately after the ground openings are formed, before significant closure thereof. An effective, convenient implement is provided for the injection of liquid manure into a field.

Figure 6:
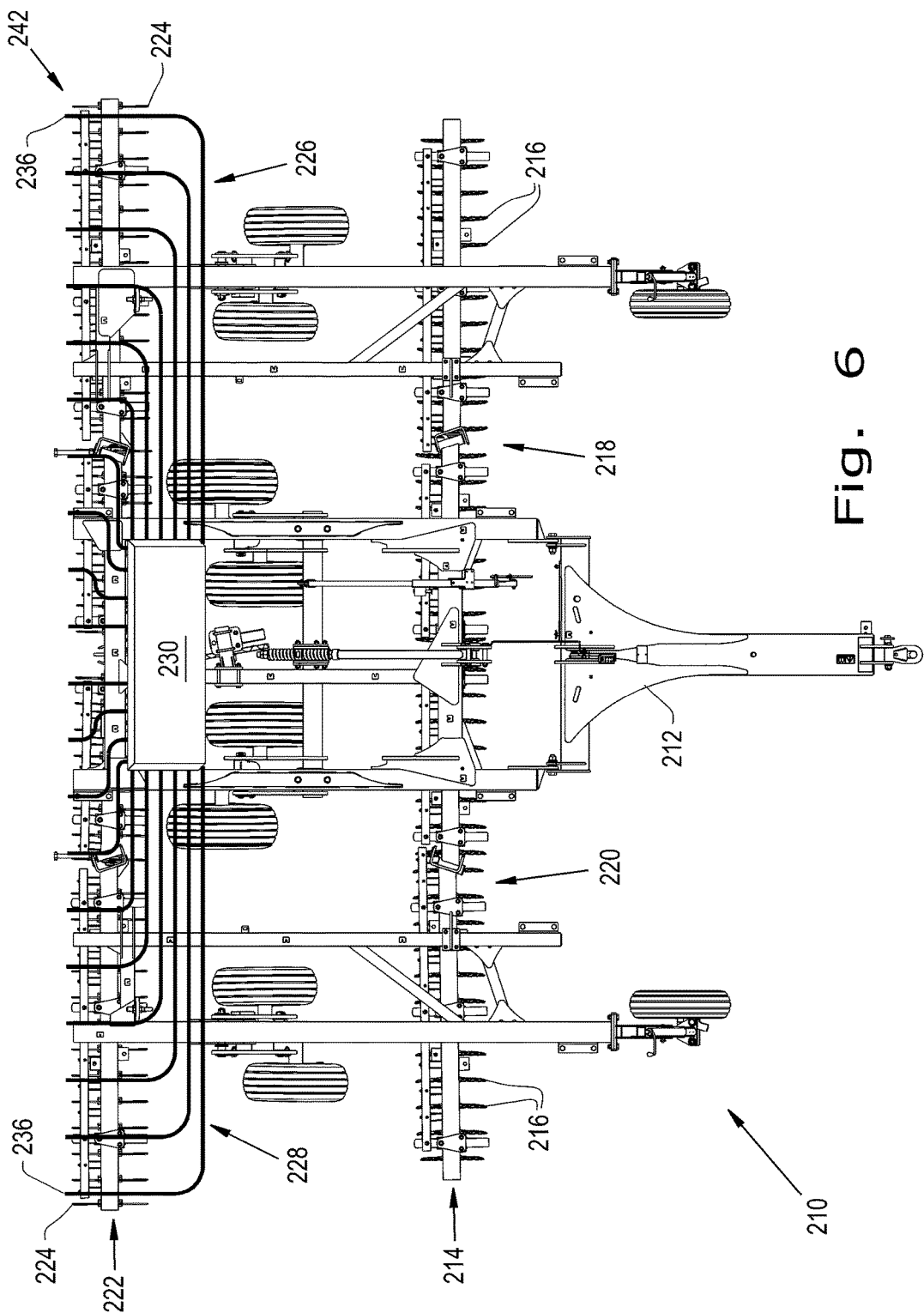
FIG. 6 is a top view of another embodiment for a hybrid tillage implement.
Figure 7:
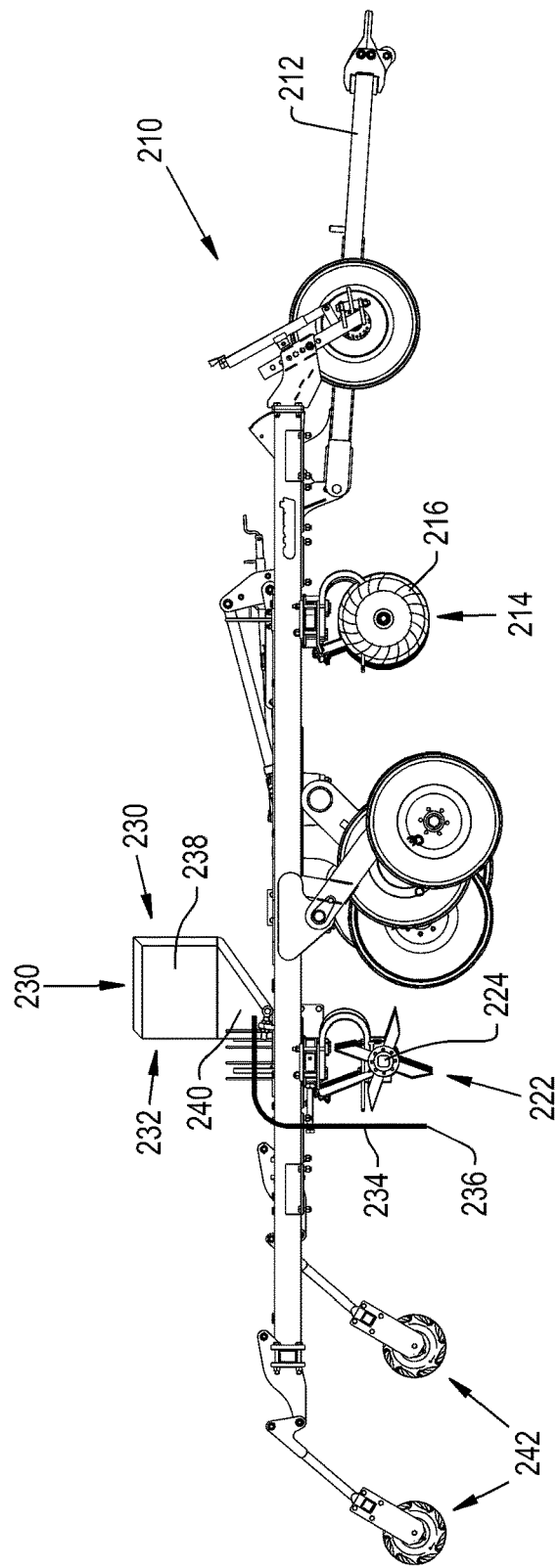
FIG. 7 is a side elevational view of the hybrid tillage implement shown in FIG. 6.

It should be understood that with other modifications, a ground deposit system can be provided for depositing other components, including granular components such as seeds onto the ground. Referring now to FIGS. 6 and 7, a further embodiment is shown for a tillage implement 210 suitable for distributing seeds, fertilizers, minerals and other granular materials onto the ground. Accordingly, tillage implement 210 may be particularly suitable for overseeding pastureland or for quickly seeding a cover crop on a recently harvested field.

Tillage implement 210 includes a main frame 212 carrying a vertical tillage section 214 having disc blades 216 carried in a disc blade left row 218 and a disc blade right row 220. Main frame 212 further carries an aerating section 222 including rotary tine assemblies 224 carried in a rotary tine assembly left row 226 and a rotary tine assembly right row 228. Disc blades 216 and rotary tine assemblies 224 are similar to the disc blades 110, 156 and rotary tine assemblies 116, 164 described previously herein. The arrangement of tillage implement 210 is similar to that of tillage implement 150 in that the disc blade left row 218 and disc blade right row 220 are substantially aligned with one another and perpendicular to the implement centerline. Tine assembly left row 226 and tine assembly right row 228 are aligned similarly, generally perpendicular to the implement centerline. However, it should be understood that the disc blade rows 218, 220 and the tine assembly rows 226, 228 can be moderately angled as well, at angles up to about five degrees, without substantially increasing the power requirement for operation.

Tillage implement 210 further includes a ground deposit system 230 configured for containing, distributing and depositing a granular component or components to be added to the soil, such as seeds, fertilizers, minerals and the like. In the embodiment shown, ground deposit system 230 includes a granular component supply 232 a granular component distribution network 234 and a granular component outlet 236 from which the granular components are broadcast onto the ground behind the rotary tine assemblies 224.

Granular component supply 232 includes a tank or reservoir 238 for containing the granular component, such as seed, fertilizer or other soil conditioning agent. Tank or reservoir 238 can be carried on main frame 212. Alternatively, tank or reservoir 238 can be a separately wheeled component, such as a wagon or cart pulled by and/or connected to tillage implement 210.

Granular component distribution network 234 includes a metering device or metering header 240 for controlling a metered flow of a granular component to granular component outlets 236. As those skilled in the art will readily understand, granular component supply 232, granular component distribution network 234 and granular component outlet 236 can include known pneumatic seeder structures used for other purposes.

Tillage implement 210 may further include a soil conditioning section 242 similar to soil conditioning section 16 described previously herein, or some such other suitable leveling, closing or tilling arrangement. Alternatively, tillage implement 210 may be provided without a finishing section 242.

Granular component ground deposit system 230 as described above provides advantageous features for many applications and uses. Implement 210 opens both substantially continuous slits formed by disc blade 216 and discrete holes formed by rotary tine assemblies 224. These ground surface openings promote the reception and retention of granular components, including seeds. By carrying granular component outlets 236 immediately behind aerating section 222 an effective and convenient seeding or other granular deposit operation is provided in a single implement also including vertical tillage and aerating. As a result, economic and effective tilling and seeding are provided.

While this invention has been described with respect to several embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
    a frame including a pull hitch extending in a travel direction over the ground;
    a vertical tillage section carried by said frame and extending generally laterally with respect to the travel direction, said vertical tillage system forming substantially continuous slits in ground being tilled;
    an aerating section carried by said frame behind said vertical tillage section in the travel direction, said aerating section extending generally laterally with respect to the travel direction, and the aerating section including individual rotary tines to create discrete holes in ground being tilled as the agricultural implement moves in the travel direction; and
    a ground deposit system connected to said frame and including a supply for a component to be deposited in the ground, a distribution network connected to said supply for distributing the component within the agricultural tillage implement, and outlets from the distribution network for expelling the component to the ground.

2. The agricultural tillage implement of claim 1, wherein said outlets are held in said aerating section.

3. The agricultural tillage implement of claim 2, said outlets being behind said individual rotary tines in said travel direction.

4. The agricultural tillage implement of claim 3, said distribution network including conduits for carrying liquid component.

5. The agricultural tillage implement of claim 3, said distribution network including a metering header and said outlets including openings for granular component.

6. The agricultural tillage implement of claim 3, said supply including a pressurized manure hose from a liquid manure holding reservoir.

7. The agricultural tillage implement of claim 3, said supply including a tank.

8. The agricultural tillage implement of claim 7, said tank being carried on said frame.

9. The agricultural tillage implement of claim 7, said tank being connected to said implement.

10. The agricultural tillage implement of claim 1, said distribution network including conduits suitable for conducting liquid manure.

11. The agricultural tillage implement of claim 1, said distribution network including a metering header and said outlets including openings for granular component.

12. The agricultural tillage implement of claim 1, said supply including a pressurized manure hose from a liquid manure reservoir.

13. The agricultural tillage implement of claim 1, said supply including a tank.

* * * * *